United States Patent [19]

Dousset

[11] Patent Number: 4,482,201
[45] Date of Patent: Nov. 13, 1984

[54] OPTICAL FIBRE CONNECTOR END FITTING, PROCESS FOR CENTERING A FIBRE IN THE END FITTING AND DEVICE FOR PERFORMING THIS PROCESS

[75] Inventor: René Dousset, Suresnes, France

[73] Assignee: Socapex, Suresnes, France

[21] Appl. No.: 365,333

[22] Filed: Apr. 5, 1982

[30] Foreign Application Priority Data

Apr. 6, 1981 [FR] France ............................ 81 06852

[51] Int. Cl.³ .................................................. G02B 7/26
[52] U.S. Cl. .................................................. 350/96.20
[58] Field of Search ................ 350/96.20, 96.21, 96.22

[56] References Cited

U.S. PATENT DOCUMENTS

| | | | |
|---|---|---|---|
| 4,113,346 | 9/1978 | Jackson et al. | 350/96.20 |
| 4,193,664 | 3/1980 | Ellwood | 350/96.21 |
| 4,330,171 | 5/1982 | Malsot et al. | 350/96.20 X |
| 4,362,356 | 12/1982 | Williams et al. | 350/96.20 |
| 4,367,011 | 1/1983 | Monaghan | 350/96.21 X |
| 4,368,948 | 1/1983 | Despouys | 350/96.20 |
| 4,416,507 | 11/1983 | Hulin et al. | 350/96.22 |

FOREIGN PATENT DOCUMENTS

| | | |
|---|---|---|
| 0008941 | 3/1980 | European Pat. Off. |
| 1458896 | 12/1976 | United Kingdom . |
| 1480445 | 7/1977 | United Kingdom . |

*Primary Examiner*—John D. Lee
*Assistant Examiner*—Akm E. Ullah
*Attorney, Agent, or Firm*—Oblon, Fisher, Spivak, McClelland & Maier

[57] ABSTRACT

The present invention relates to an optical fibre connector end fitting, a process for centering this fibre, as well as a device for centering the fibre in the end fitting. According to the invention, the end fitting includes a sleeve on which is positioned a centering device having a corresponding internal shape and having a cylindrical opening in which is housed the fibre. The end fitting also has a hole, which is connected to the internal cylindrical channel of the end fitting and into which is poured a polymerizable resin, while the fibre is held in place by the centering device. After polymerization, the terminal portion of the end fitting is polished by means of a suitable tool.

11 Claims, 4 Drawing Figures

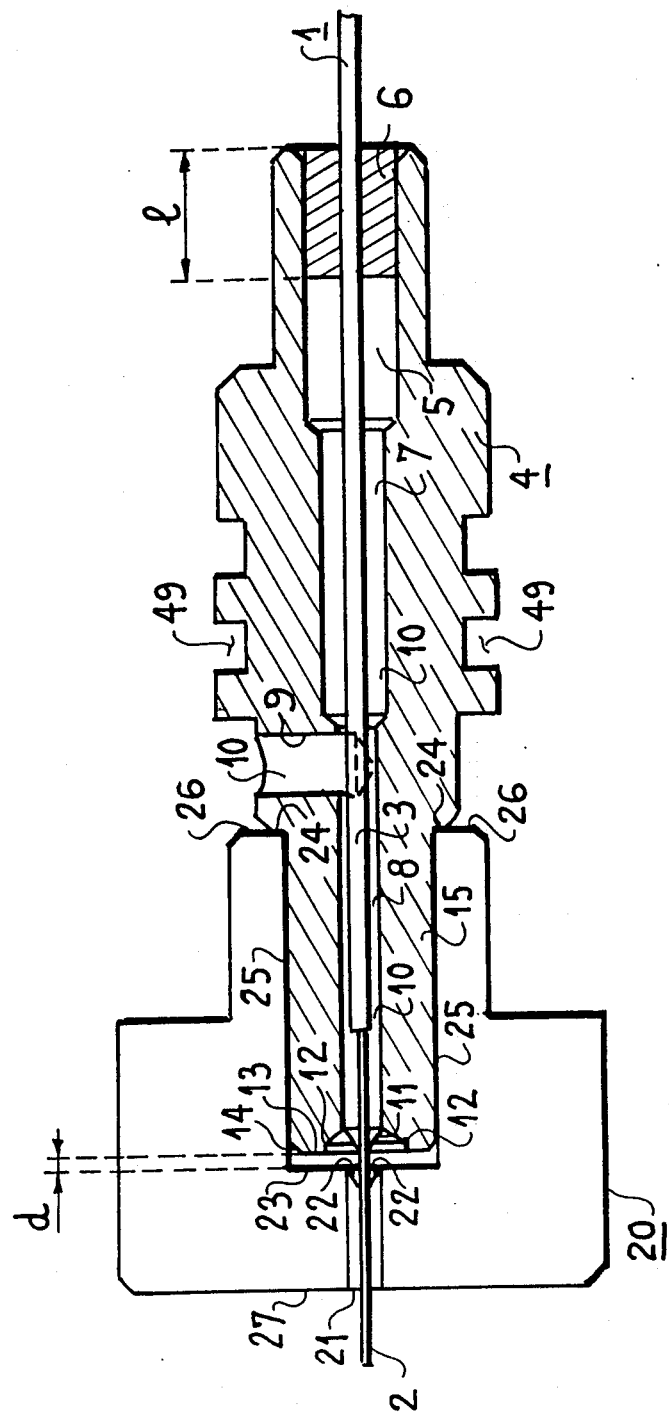

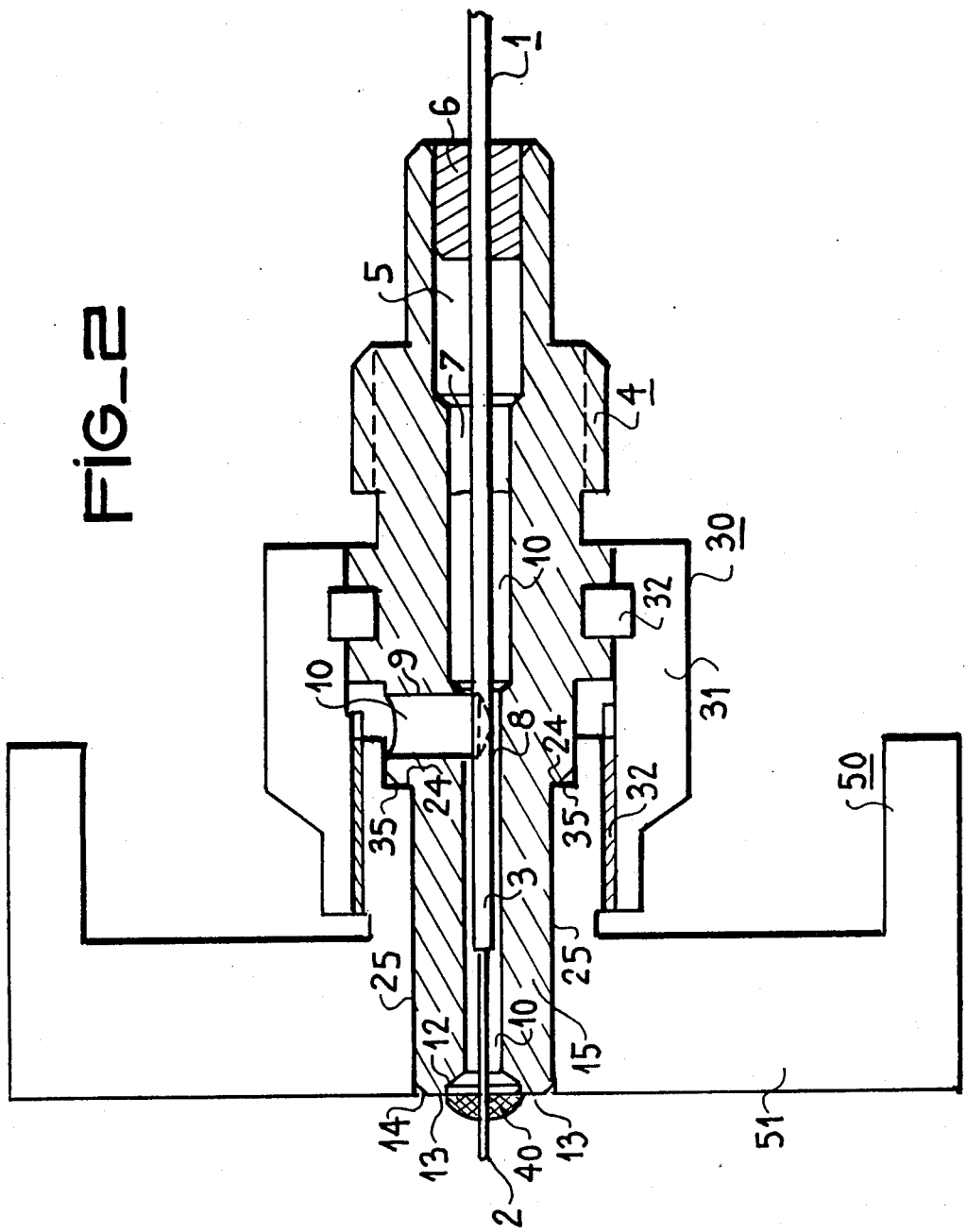
FIG_2

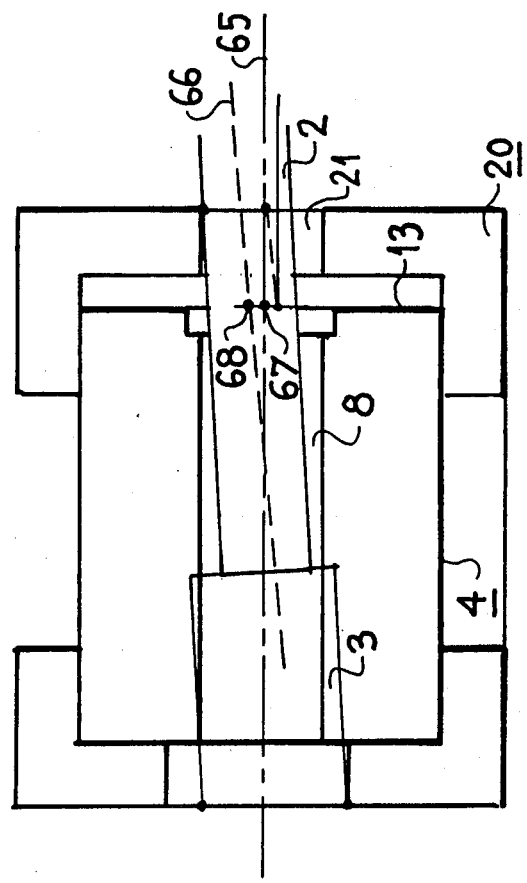
FIG_4
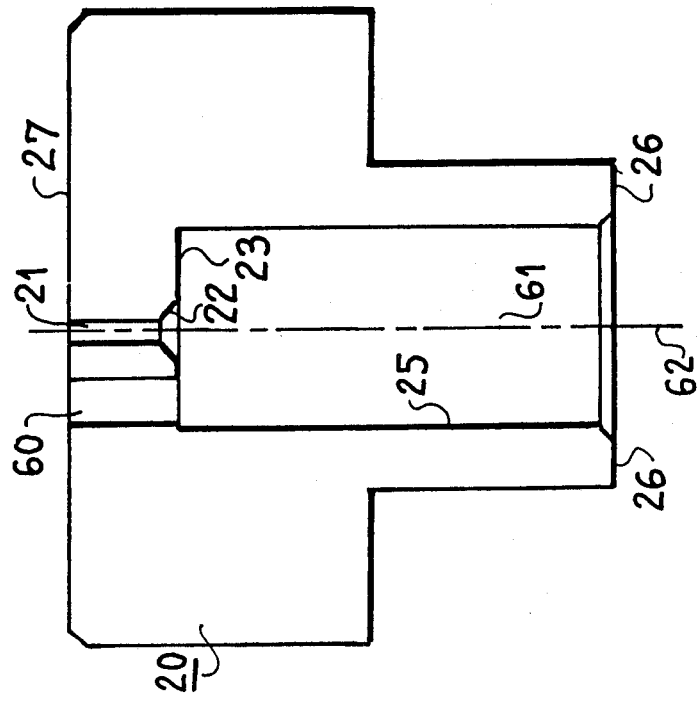
FIG_3

OPTICAL FIBRE CONNECTOR END FITTING, PROCESS FOR CENTERING A FIBRE IN THE END FITTING AND DEVICE FOR PERFORMING THIS PROCESS

BACKGROUND OF THE INVENTION

1. Field Of The Invention

The present invention relates to an optical fibre connector end fitting comprising a cylindrical centering sleeve in which is formed a cylindrical channel permitting the passage of the fibre, said centering sleeve having at its front end a contact face, where the said fibre emerges. It also relates to a process for centering the fibre in the end fitting, as well as to a device for performing this centering process.

2. Description of the Prior Art

It is known, for example, from U.S. Pat. No. 4,193,664 to produce optical monofibre connector end fittings or terminations for interconnecting the different fibres. The problem which is at present encountered in producing monochannel connectors for optical fibres is the centering of the fibre in the end fitting, so as to permit light transmission with the minimum losses at the connection. In the aforementioned U.S. Patent, the end fitting has two V-shaped reference planes and the optical fibre is positioned with respect thereto. For this purpose, a centering device is used having e.g. two V-shaped planes, which are complementary to those of the end fitting, whilst the actual fibre is positioned in a groove constituted by two planes parallel to the two aforementioned V-shaped planes and disposed respectively at very precise distances from one another. The fibre is then fixed by means of a polymerizable resin in the end fitting, after which the latter is removed from the positioning means and following polishing or burnishing of the end portion thereof, it is ready for use.

However, such a process has a number of disadvantages. In particular, the end fitting must have two V-shaped planes and a very precise angle between the planes also must be respected. This is relatively difficult to achieve and the end fittings used in this method are consequently expensive. Moreover, during the centering of the fibre, it is necessary to firmly apply the reference planes of the end fitting to the reference planes of the device and such operations have to be carried out with a great deal of care. Although this method is generally satisfactory, there are numerous cases when it is only necessary to have a lower degree of precision than that achieved with the said method, provided that the procedure then used is easier to perform.

BRIEF SUMMARY OF THE INVENTION

The optical fibre connector end fitting according to the invention makes it possible to obviate these disadvantages.

The present invention therefore relates to an optical fibre connector end fitting which comprises a radial cylindrical hole connected to the cylindrical channel, as well as a centering bush located towards its rear end, the fibre being held substantially parallel to the axis of the cylindrical channel, on the one hand in the rear portion of the end fitting by the centering bush and, on the other hand, in the front portion of the sleeve by a polymerized resin introduced through the cylindrical hole before polymerization and which holds the fibre in this position after polymerization.

According to a preferred embodiment, the optical fibre connector end fitting according to the invention has a chamfer in the vicinity of the front end of the cylindrical channel of the sleeve.

The invention also relates to a process for centering an optical fibre in an end fitting as described hereinbefore. According to the invention, the sleeve located at the front end of the end fitting is covered by a centering device having a cylindrical internal shape complementary to that of the sleeve with, in its centre, a cylindrical opening having essentially the same diameter as that of the fibre to be centered. The optical fibre is then introduced into the cylindrical channel of the end fitting, the fibre then being slid into the cylindrical opening of the centering device and passes from one side to the other of the latter. As the sleeve has very precise external dimensions and the centering device has very precise internal dimensions, accompanied by a very precise positioning of the cylindrical opening with respect to the cylindrical inner walls complementary to those of the sleeves, the optical fibre is in this way perfectly centered in the sleeve. By means of the radial cylindrical hole, a polymerizable liquid resin is then introduced into the cylindrical channel, said resin surrounding as a result of its matched fluidity the optical fibre, optionally provided with a sheath. As the polymerizable resin is chosen from among the thermosetting resins which polymerize very rapidly at ambient temperature, the fibre is rapidly and definitively centered in the end fitting. To prevent contamination of the centering device by the resin, the front end portion of the cylindrical channel of the sleeve is provided with a chamfer forming a small cavity at the end of the sleeve. This chamfer is preferably constituted by a cylindrical shape, whose diameter is greater than the diameter of the cylindrical channel. This more particularly ensures that the resin does not pass substantially beyond the front face of the sleeve. In addition, the end fitting on the one hand and the centering device on the other, are provided with abutments, which cooperate with one another so as to leave a space between the front face of the sleeve and the bottom of the internal cylindrical cavity of the centering device.

Moreover, the cylindrical opening located substantially in the centre of the cylindrical cavity of the centering device has a chamfer to facilitate the introduction of the optical fibre.

To ensure that the optical fibre is not perfectly centered in the cylindrical opening of the centering device, but is slightly displaced with respect to the centre of the cylindrical channel at the front face of the sleeve, in the vicinity of its rear end the connector end fitting is provided with a centering bush or socket having an adequate length, which essentially maintains the fibre in the axis of the cylindrical channel and which cooperates with the cylindrical opening of the centering device to still further improve the centering of the fibre in the end fitting.

When the resin used is polymerized, the centering device is then removed from the sleeve. A drop of resin, preferably the same as the already used resin, is then deposited in the cylindrical chamfer at the front face of the sleeve. In this way, the chamfer is completely filled with resin, the quantity of the latter being sufficient to bring about a resin cone disposed above the front face of the end fitting and whereof the optical fibre constitutes the axis.

The sleeve is then provided with a polisher having a central opening with the same internal dimensions as those of the sleeve, except for the tolerances. The front surface of the sleeve is then level with the planar face of the polisher. To ensure a perfect alignment of these two faces corresponding to the conditions of use, the polisher is provided with fixing means complementary to those of the end fitting. The dimensions of the polisher are then calculated in such a way that when these fixing means are assembled, the front face of the sleeve and the planar face of the polisher are strictly aligned. The polymerized resin cone surrounding the fibre then projects significantly above the planar face of the said polisher. The fibre - resin assembly is then straightened by alignment on the planar face of the polisher. Following separation of the polisher and the end fitting, an end fitting is obtained in which the optical fibre is perfectly centered and whose end is perfectly aligned with the front face of the sleeve.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1 shows a connector end fitting according to the invention for an optical monofibre, the sleeve of the end fitting being provided with a centering device.

FIG. 2 shows the optical monofibre connector end fitting provided with its polisher.

FIG. 3 is a view of the centering device according to the present invention.

FIG. 4 is a diagrammatic view explaining the function of the end fitting centering bush.

DETAILED DESCRIPTION OF THE PREFERRED EMBODIMENTS

FIG. 1 shows the first stage of the process according to the invention consisting of centering the fibre in the end fitting and pouring a polymerizable resin into the central cylindrical channel thereof. Optical cable 1 comprises an optical fibre 2, optionally covered with its optical sheath and a protective sheath 3. The sheath can either be a coating, or optionally the actual optical sheath in the case where the latter is a flexible sheath of the silicone type. Optical fibre 2 is placed in the central cylindrical channel of end fitting 4 and which comprises in succession several parts whose diameters decrease form the rear part to the front part of the end fitting. The rear part 5 of the cylindrical channel has a relatively large diameter compared with that of the fibre covered with its sheath in order to permit the housing of the centering bush or socket 6. It is continued by a central part having a smaller diameter, which is in turn continued by a cylindrical channel 8, whose diameter is only slightly larger than the external diameter of the fibre covered with its sheath. In its front part, end fitting 4 has a centering sleeve 15. The latter is cylindrical and has precise external dimensions serving as a reference. The cylindrical channel 8 is perfectly centered with respect to the axis of sleeve 15, within the limit of acceptable tolerances. Sleeve 15 is terminated by a chamfer 14 connecting its cylindrical wall 25 to the front face 13 of the said sleeve. The front face is perfectly planar and perpendicular to the axis of sleeve 15. Level with the front face 13, sleeve 15 is terminated by an internal chamfer 12 formed from a cylindrical portion extended towards the interior of the cylindrical channel by a conical portion joining the said channel 8, which facilitates machining of this shape. In a preferred manner, it has been found that the best results are obtained when there is no conical portion of the chamfer, i.e. when the latter was cylindrical. In the vicinity of but not on sleeve 15 in this embodiment the end fitting also has a radial cylindrical hole or opening 9 connected to the front cylindrical channel 8, to the central and rear parts 7 and 5 of the channel. End fitting 4 also has cavities 49 for housing a joint and a bush (not shown in the drawing) in order to give the end fitting the characteristics well known in SMA-type connectors.

Centering device 20 is positioned on centering sleeve 15 and has a cylindrical internal cavity with the same diameter as the external diameter of the reference cylinder 15, except for the tolerances. The inner walls of the centering device are also designated in the drawing by reference numeral 25, as are the outer walls of sleeve 15. The internal cavity of the centering device is extended towards the rear thereof by abutments 26 which cooperate with the corresponding abutments 24 of end fitting 4. The abutments 24 level with end fitting 4 are merely constituted by a collar having a diameter larger than that of the reference cylinder 15. Abutments 26 are constituted by planes perpendicular to the axis of the centering device cavity. The depth of the internal cavity of the centering device 20 slightly exceeds the length of sleeve 15. When abutments 24 and 26 come into contact with one another, the front face of sleeve 15 and bottom 23 of the internal cavity of the centering device are at a distance from one another equal to d. In practice, a distance d of about 0.1 mm is particularly satisfactory.

The cylindrical opening 21 located exactly in the center of the cylindrical cavity of the centering device and passing from one side to the other of the latter from its face 23 to its face 27, is provided with a chamfer 22 permitting an easier introduction of fibre 2.

With the elements disposed in the manner described hereinbefore and, as shown in FIG. 1, a liquid polymerizable resin 10 is introduced into opening 9, the latter partly spreading into channel 7 and completely filling channel 8 until a chamfer 11 is formed at the end of channel 8. The polymerizable resin can be constituted by any known resin for this purpose. As a function of the diameter of the openings, the nature of the fibres used, as well as the nature of their sheaths, together with all the other parameters involved, a polymerizable resin or glue will be used, whose fluidity is adapted in such a way that it behaves in the manner described hereinbefore. This can be brought about by simple routine manipulations of commercially available polymerizable resins. In particular, known epoxy resins or glues of one or two component types will be used, as well as acrylate glues. In particular, those resins polymerizing at ambient temperature and in a very short time e.g. will be used. When polymerization has taken place, the centering device is removed from end fitting 4.

The following operation consists of filling chamfer 12 with a drop of resin in the manner described hereinbefore, so as to form a cone above the contact face 13 of sleeve 15. The sequence of operations is then shown in FIG. 2 in which the same elements as in FIG. 1 carry the same references. End fitting 4 is provided with a polisher 50 having an inner cylindrical channel with the same dimensions, except for the tolerances, as the external dimensions of sleeve 15. The cylindrical channel emerges onto the front face 51 of polisher 50, which has abutments 35 cooperating with abutments 24 of end fitting 4. These abutments are positioned in such a way that the front face 13 of sleeve 15 is precisely aligned with the front face 51 of polisher 50. Polisher 50 has a thread 32, which cooperates with ring 30 integral with end fitting 4 by means of joint 32. The end fitting and its ring constitute a connector end fitting known in this field as SMA. Ring 30 has a body 31, which also has an internally threaded part, which cooperates with thread 32 of polisher 50. These different threads make it possible to accurately abut the polisher and end fitting 4 and hold them firmly in position. The coneshaped resin block 40 above chamfer 12 of channel 8 is then straightened by known means, so as to perfectly align the front end 13 of sleeve 15, the resin and the optical fibre 2. Following this operation, which causes no special difficulties, the polisher is then removed from the end fitting which is ready for use.

FIG. 3 shows a detailed view of the centering device according to the invention, the same elements as in the preceding drawings carrying the same references. Centering device 20 has a cylindrical internal shape 61 complementary to that of the sleeve 15, having an axis of symmetry identical to that of cylindrical opening 21. Moreover, the dimensions of the inner walls 25 and those of sleeve 15 are very close to one another, so that it is necessary to provide a complementary opening 60 permitting the removal of air during the insertion of the sleeve into the centering device.

FIG. 4 diagrammatically shows an end fitting in which no centering bush 6 has been used. Diagrammatically, end fitting provided with centering device 20 is shown. As the fibre is not held by the centering bush 6, its axis 66 necessarily slopes to a certain extent with respect to axis 65 of the cylindrical channel 8. As a function of the tolerances on the fibre and on hole 21, said angle can vary and can lead to relatively significant centering errors. Thus, in FIG. 4, these errors are greatly exaggerated, but it is possible to see that the centre 67 of channel 8 level with the front face 13 of the sleeve does not coincide with the centre 68 of the fibre level with said face 13. Therefore, if the end fitting to which the latter is to be connected has the same centering error, but in the opposite direction, there can be relatively high transmission losses at the connection. It is for this reason that the centering bush 6 according to the invention is particularly important if it is desired to obtain a high quality connection. In all cases, it is possible to improve the optical transmission by providing error elimination means on each end fitting during their coupling into a connector.

As a function of the circumstances, the optical fibres used for the realization of the invention may or may not be provided with their optical sheaths and may or may not be provided with a surface protection coating. When using hard fibres, i.e. fibres with a hard sheath of the glass - glass or silica - silica type, it is obvious that the optical sheath is necessarily maintained on the fibre over the entire length thereof. As these fibres are generally covered with a relatively flexible polymer coating, the latter can be retained if the coating is sufficiently concentric with respect to the optical sheath of the fibre for the envisaged application. If this is not the case, the fibre will be bared in such a way that the coating does not extend beyond area 7 of the cylindrical channel of the end fitting. When using fibres with flexible sheaths, it is either possible to take a reference of the sheath if the latter is sufficiently concentric, or take a reference directly on the fibre. In the latter case, the optical sheath will be removed from the end of fibre 2, so that only the actual fibre core is introduced into the cylindrical opening 21, which will have matched dimensions. To ensure a good connection, the optical sheath is held on the fibre up to the level of surface 23 above the front face 13 of sleeve 15.

Obviously, numerous modifications and variations of the present invention are possible in light of the above teachings. It is therefore to be understood that within the scope of the appended claims, the invention may be practiced otherwise than as specifically described herein.

What is claimed is:

1. An optical fibre connector end fitting comprising: a cylindrical centering sleeve in which is provided a cylindrical channel permitting the passage of the fibre, said centering sleeve having on its front end a contact face at which the said fibre emerges including a radial cylindrical hole connected to the cylindrical channel, and which further comprises a centering bush located at a rear end portion thereof, the fibre being positioned substantially parallel to the axis of the cylindrical channel in the rear portion of the end fitting via said centering bush and in the front portion of the sleeve via a polymerized resin introduced through said cylindrical hole prior to polymerization and which holds the fibre in position after polymerization.

2. An end fitting according to claim 1, wherein the sleeve has a chamfer located in the vicinity of the front end of the cylindrical channel.

3. An end fitting according to claims 1 or 2, which further comprises a sheath which covers said fibre.

4. An end fitting according to claim 1, wherein the cylindrical channel includes stepped portions of decreasing diameter from a rear part to a front part thereof, a furthest rearward part having a diameter permitting housing of the centering bush therein.

5. An end fitting according to, 1 further comprising a centering device having a cylindrical internal shape complementary to and cooperatively engaged with the sleeve, a base of the centering device having in a center portion thereof a cylindrical opening of a diameter substantially the same as that of the fibre to be centered and which is oriented parallel to the cylindrical axis.

6. An end fitting according to claim 5, said centering device having an opening permitting the removal of air during the centering operation.

7. A process for centering a fibre in an end fitting utilizing a sleeve in which is formed a cylindrical channel and including a centering device having an internal cylindrical shape of a diameter substantially the same as that of said fibre complementary to that of said sleeve and a cylindrical opening in a center portion thereof, and a centering bush, which comprises:
introducing said sleeve into said centering device through said centering bush followed by said cylindrical opening so as to be centered with respect to the said channel;
introducing a liquid polymerizable resin into the channel so as to hold the fibre in position after polymerization
polymerizing said resin; and removing the centering device after polymerizing the resin.

8. A process according to claim 7, which further comprises: maintaining an adequate distance between a front end portion of the sleeve and a bottom portion of the centering device so as to prevent contact between the resin and the centering device.

9. A process according to claims 7 or 8, said centering device having at least one external abutment which further comprises said at least one abutment contacting with at least one corresponding abutment of the end fitting.

10. A process according to claim 7, the sleeve having a chamfer located at a front end portion of the cylindrical channel, which further comprises filling said chamfer with said polymerizable resin so as to form a cone which projects with respect to a front face portion of the sleeve.

11. A process according to claim 7, which further comprises fitting a polisher having a planar face to the sleeve, said polisher having a central opening penetrated by the sleeve, said sleeve having a front face level with the planar face of the polisher, the resin and fibre projecting with respect to the planar face and the front face and being aligned with respect to one another, straightened and brought into the same plane as said faces.

* * * * *